United States Patent Office 3,692,673
Patented Sept. 19, 1972

3,692,673
WATER-SOLUBLE SULFONATE POLYMERS
AS FLOCCULANTS
Donald Irvin Hoke, Chagrin Falls, Ohio, assignor to The
Lubrizol Corporation, Wickliffe, Ohio
No Drawing. Filed Feb. 12, 1971, Ser. No. 115,085
Int. Cl. B01d 21/01
U.S. Cl. 210—52                    13 Claims

ABSTRACT OF THE DISCLOSURE

Polymers of acrylamido sulfonic acids and their salts, especially 2-acrylamido-2-methylpropanesulfonic acid and its salts, are useful as flocculants for aqueous systems, especially in combination with inorganic co-flocculants.

This invention relates to methods for treatment of water, and more particularly to methods for flocculating solids suspended therein. Still more particularly, it relates to a method of flocculating solids suspended in an aqueous medium which comprises adding to said medium an effective amount of a water-soluble polymer containing units of the formula

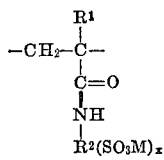

wherein $R^1$ is hydrogen or a lower alkyl or substituted lower alkyl radical, $R^2$ is a divalent or trivalent hydrocarbon or substituted hydrocarbon radical, M is hydrogen or one equivalent of a cation, and $x$ is 1 or 2.

The development of improved flocculants has become of increasing interest recently, in view of the attention being given to avoidance of water pollution. It is common to use such flocculants during precipitation of sewage in treatment plants to insure that substantially all suspended matter is removed before the treated water is passed back into natural waterways. Flocculants are also useful in various industrial processes for the deposition and recovery of various kinds of suspended solids from water.

A principal object of the present invention, therefore, is to provide improved flocculants and methods of flocculating.

A further object is to provide readily available polymers which serve as excellent flocculants and water treatment agents.

Other objects will in part be obvious and will in part appear hereinafter.

In brief, the method described herein involves the use as flocculants of water-soluble polymers of N-sulfohydrocarbon-substituted acrylamines. These acrylamides are represented by the above formula in which $R^1$ is hydrogen or a lower (as defined hereinafter) alkyl radical and $R^2$ is a divalent or trivalent hydrocarbon radical. As used herein, the term "hydrocarbon radical" includes aliphatic, cycloaliphatic and aromatic (including aliphatic- and cycloaliphatic-substituted aromatic and aromatic-substituted aliphatic and cycloaliphatic) radicals. It also includes cyclic radicals wherein the ring is completed through another portion of the molecule; that is, any two indicated substituents may together form a cyclic hydrocarbon radical.

The following are illustrative of divalent hydrocarbon radicals within the scope of this invention. Where a named radical has several isomeric forms (e.g., butylene), all such forms are included.

Methylene
Ethylene
Propylene
Butylene
Hexylene
Octylene
Decylene

Cyclohexylene
Cyclopentylene
Methylcyclopentylene

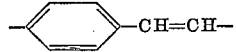

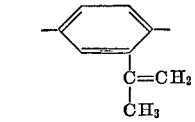

—CH=CH—
—CH=CHCH$_2$—
—C≡C—
—C≡C—CH$_2$—
Phenylene
Tolylene
Xylylene
Naphthylene
—C$_6$H$_2$(C$_2$H$_5$)$_2$—
—C$_6$H$_4$(CH$_2$)$_{11}$CH$_2$—

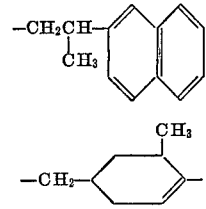

Trivalent radicals are similar to the above but have an additional hydrogen atom abstracted.

Many obvious variations of these radicals will be apparent to those skilled in the art and are included within the scope of the invention.

Substituted hydrocarbon, alkyl, aryl, alkylene, arylene, etc., radicals are considered fully equivalent to the hydrocarbon, alkyl, aryl, alkylene, arylene, etc., radicals and to be part of this invention. By "substituted" is meant radicals containing substituents which do not alter significantly the character or reactivity of the radical. Examples are:

Halide (fluoride, chloride, bromide, iodide)
Hydroxy
Ether (especially lower alkoxy)
Keto
Carboxy
Ester (especially lower carbalkoxy)
Aminoacyl (amide)
Amino
Nitro
Cyano
Thioether
Sulfoxy
Sulfone
Sulfonic acid ester, amide, etc.

In general, no more than about three such substituent groups will be present for each 10 carbon atoms in the radical.

Preferably, the hydrocarbon or substituted hydrocarbon radicals in the compounds used in the method of this invention are free from ethylenic and acetylenic unsaturation and have no more than about 30 carbon atoms, desirably no more than about 12 carbon atoms. A particular preference is expressed for lower hydrocarbon radicals, the word "lower" denoting radicals containing up to seven carbon atoms. Still more prefererably, they are lower alkylene or arylene radicals, most often alkylene.

In the formula, $R^1$ is hydrogen or lower alkyl but is preferably hydrogen or methyl, usually hydrogen. $R^2$ may be any divalent or trivalent hydrocarbon radical, preferably lower alkylene or arylene and usually lower alkylene. In a preferred embodiment of this invention,

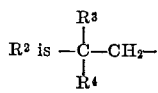

wherein $R^3$ is hydrogen or a lower alkyl (usually) or aryl radical, $R^4$ is hydrogen or (usually) a lower alkyl radical and the sulfonic acid group is attached to the unsubstituted methylene carbon. These polymers may be obtained by the polymerization, either alone or in combination with other polymerizable vinyl monomers, of the corresponding monomeric N-sulfohydrocarbon-substituted acrylamides of which the following are examples.

2-acrylamidoethanesulfonic acid

2-acrylamidopropanesulfonic acid

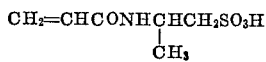

2-acrylamido-2-methylpropanesulfonic acid

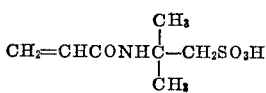

3-methacrylamidopropanesulfonic acid

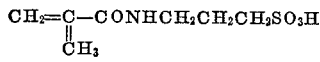

4-methacrylamidocyclohexanesulfonic acid

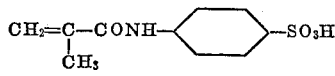

2-acrylamido-2-phenylethanesulfonic acid

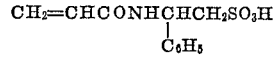

2-acrylamido-2-phenylpropanesulfonic acid

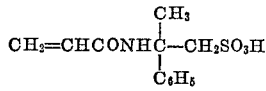

4-acrylamidobenzenesulfonic acid

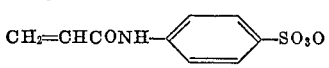

5-acrylamidobenzene-1,3-disulfonic acid

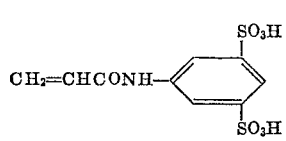

From the standpoint of economy, ease of preparation and polymerization, and effectiveness, the most desirable flocculants are polymers of 2-acrylamido-2-methylpropanesulfonic acid or its salts, usually alkali metal or ammonium salts and preferably sodium or potassium salts. The term "N-sulfohydrocarbon-substituted acrylamide" when used hereinafter will refer to this class of compounds generally, with the understanding that the above-named compound is especially preferred.

The N-sulfohydrocarbon-substituted acrylamide polymers used in the method of this invention may be homopolymers or interpolymers, the latter containing at least about 5% by weight, and preferably at least about 50%, of N-sulfohydrocarbon-substituted acrylamide units. The identity of the other monomer or monomers is not critical except that the polymer must be water-soluble. The most useful polymers are homopolymers and copolymers with 5–95%, preferably 5–50% and most desirably 5–30%, of an acrylic monomer such as acrylic or methacrylic acid or a salt or amide thereof, notably acrylamide, methacrylamide, N-methylacrylamide, N - (1,1 - dimethyl-3-dimethylaminobutyl)acrylamide and the like. Very high molecular weight polymers are preferred.

The polymers may be prepared in bulk, solution, suspension or emulsion by methods known in the art. Since they must be water-soluble, it is frequently convenient to prepare them in aqueous solution. Another method, which has been found particularly useful, is to prepare an aqueous solution of the monomer or monomers and suspend the same in a water-immiscible solvent such as an aliphatic or aromatic hydrocarbon or halogenated hydrocarbon. Generally, the sulfonic acid monomer is converted to its metal salt prior to polymerization by means of a suitable alkaline reagent. When polymerization is effected in suspension, ordinary suspending agents known to those skilled in the art are used.

The polymerization may be promoted by typical initiators used in aqueous systems, especially peroxides, persulfates, persulfate-bisulfite and the like. It has been found that the alkali metal salts, especially the sodium salt, of 2-acrylamido-2-methylpropanesulfonic acid may frequently be polymerized in the absence of polymerization initiator.

It is sometimes advantageous to carry out the polymerization in the presence of a small amount of chain transfer agent, which tends to cause formation of a polymer with more uniformity in molecular weight than is otherwise produced. Suitable chain transfer agents include mercaptosuccinic acid and others known to those skilled in the art.

Flocculation is accomplished according to this invention by merely adding an effective amount of the polymer to the suspension being flocculated. The amount added may be between about 0.01 and 10 p.p.m. but is usually about 0.5–1.0 p.p.m. It is usually advantageous, and in commercial flocculation frequently essential, also to add an inorganic co-flocculant such as ferric sulfate, aluminum sulfate, calcium hydroxide or the like in the amount of about 1–250 p.p.m. Coagulation aids such as bentonite may also be added.

The method of this invention is illustrated by an experiment which shows the effects as flocculants of several polymers of sodium 2-acrylamido-2-methylpropanesulfonate. The polymers are used in combination with an inorganic co-flocculant to effect precipitation of a suspension of 200 p.p.m. of kaolin in water. The inorganic co-flocculant is added as a 0.5% aqueous solution while stirring rapidly for three minutes; the suspension is then stirred slowly for 12 minutes, the polymer is added (as a 1% aqueous solution) during a second three-minute period of fast stirring, the suspension is stirred slowly again for 12 minutes and allowed to stand for 15 minutes. The turbidity of the liquid is then measured using a Bryce-Phoenix light scattering photometer.

The polymer solutions used are as follows:

(1) A homopolymer of sodium 2-acrylamido-2-methylpropanesulfonate, prepared by agitating an aqueous solution of the sulfonic acid monomer with an equivalent amount of sodium carbonate until polymerization is complete.

(2) A homopolymer of sodium 2-acrylamido-2-methylpropanesulfate prepared by dissolving the sulfonic acid monomer and an equivalent amount of sodium hydroxide in water and polymerizing in the presence of ammonium persulfate and sodium bisulfite.

(3) A copolymer prepared from 80 parts of sodium 2-acrylamido-2-methylpropanesulfonate and 20 parts of sodium acrylate, by polymerization in aqueous solution in the presence of ammonium persulfate and sodium bisulfite.

(4) A copolymer of 95 parts of sodium 2-acrylamido-2-methylpropanesulfonate and 5 parts of acrylamide, prepared in aqueous solution using an ammonium persulfate-sodium bisulfite initiator.

(5) A copolymer of 50 parts of 2-acrylamido-2-methylpropanesulfonate with 50 parts of N-(1,1-dimethyl-3-dimethylaminobutyl)acrylamide quaternized with dimethyl sulfate, said copolymer being prepared in aqueous solution using an ammonium persulfate initiator. (The preparation of N - (1,1-dimethyl-3-dimethylaminobutyl)acrylamide is described in copending application Ser. No. 832,412, filed June 11, 1969.)

The results are given in Table I.

TABLE I

| Polymer | Polymer conc., p.p.m. | Salt | Salt conc., p.p.m. | Turbidity |
|---|---|---|---|---|
|  | 0 |  | 0 | 7.96 |
|  | 0 | Fe₂(SO₄)₃ | 3 | 7.62 |
| 1 | 0.03 | Fe₂(SO₄)₃ | 18 | 0.23 |
| 1 | 0.1 | Fe₂(SO₄)₃ | 3 | 0.12 |
| 1 | 0.5 | Fe₂(SO₄)₃ | 3 | 0.15 |
| 1 | 1.0 | Fe₂(SO₄)₃ | 3 | 0.24 |
| 5 | 0.1 | Al₂(SO₄)₃ | 10 | 0.33 |
| 5 | 0.8 | Al₂(SO₄)₃ | 5 | 0.29 |

In Table II are given similar results on flocculation of sewage obtained from the sewage treatment plant of Euclid, Ohio.

TABLE II

| Polymer | Polymer conc., p.p.m. | Fe₂(SO₄)₃ conc., p.p.m. | Turbidity |
|---|---|---|---|
| 1 | 0.2 | 2 | 0.083 |
| 1 | 1.0 | 10 | 0.026 |
| 1 | 1.0 | 100 | 0.008 |
| 2 | 2.0 | 100 | 0.316 |
| 2 | 5.0 | 200 | 0.008 |
| 3 | 1.0 | 10 | 0.176 |
| 3 | 5.0 | 10 | 0.106 |
| 4 | 5.0 | 200 | 0.008 |

What is claimed is:

1. A method of fluocculating solids suspended in an aqueous medium which comprises adding to said medium an effective amount of a water-soluble polymer containing units of the formula

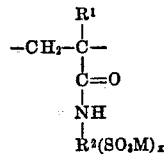

wherein $R^1$ is hydrogen or a lower alkyl or substituted lower alkyl radical, $R^2$ is a divalent or trivalent hydrocarbon or substituted hydrocarbon radical, M is hydrogen or one equivalent of a cation, and $x$ is 1 or 2.

2. A method according to claim 1 wherein said polymer is added to said medium in combination with an inorganic co-fluocculant.

3. A method according to claim 1 wherein $R^1$ is hydrogen or methyl and $R^2$ is a lower alkylene radical.

4. A method according to claim 3 wherein $x$ is 1, $R^2$ is

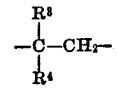

each of $R^3$ and $R^4$ is hydrogen or a lower alkyl radical and the sulfonic acid group is attached to the unsubstituted methylene carbon.

5. A method according to claim 4 wherein said polymer is added to said medium in combination with an inorganic co-fluocculant.

6. A method according to claim 4 wherein M is an alkali metal cation.

7. A method according to claim 6 wherein $R^1$ is hydrogen and each of $R^3$ and $R^4$ is methyl.

8. A method according to claim 7 wherein the polymer is a homopolymer or a copolymer with 5–95% of an acrylic monomer.

9. A method according to claim 8 wherein said polymer is added to said medium in combination with an inorganic co-flocculant.

10. A method according to claim 9 wherein the polymer is a homopolymer.

11. A method according to claim 7 wherein the acrylic monomer is acrylamide.

12. A method according to claim 9 wherein the polymer is a copolymer with 5–95% of an acrylic monomer.

13. A method according to claim 12 wherein the acrylic monomer is acrylamide.

References Cited

UNITED STATES PATENTS 3,332,904  7/1967  Lacombe et al. 260—79.3 MU X
2,909,508  10/1959  Jones _____ 210—54 X
3,312,671  4/1967  Swisher _____ 210—54 X MICHAEL ROGERS, Primary Examiner U.S. Cl. X.R.

260—79.3

Dedication 3,692,673.—*Donald Irvin Hoke*, Chagrin Falls, Ohio. WATER-SOLUBLE SULFONATE POLYMERS AS FLOCCULANTS. Patent dated Sept. 19, 1972. Dedication filed Sept. 10, 1981, by the assignee, *The Lubrizol Corp.*

Hereby dedicates to the Public the entire remaining term of said patent.

[*Official Gazette Feb. 2, 1982.*]